(12) United States Patent
King et al.

(10) Patent No.: US 10,315,330 B2
(45) Date of Patent: Jun. 11, 2019

(54) TREATED POROUS MATERIAL

(71) Applicant: Dow Global Technologies LLC, Midland, MI (US)

(72) Inventors: Stephen W. King, League City, TX (US); Xue Chen, Manvel, TX (US); David L. Malotky, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 19 days.

(21) Appl. No.: 15/537,253

(22) PCT Filed: Jun. 30, 2015

(86) PCT No.: PCT/US2015/038480
§ 371 (c)(1),
(2) Date: Jun. 16, 2017

(87) PCT Pub. No.: WO2016/105598
PCT Pub. Date: Jun. 30, 2016

(65) Prior Publication Data
US 2017/0355098 A1 Dec. 14, 2017

Related U.S. Application Data

(60) Provisional application No. 62/096,046, filed on Dec. 23, 2014.

(51) Int. Cl.
| | |
|---|---|
| *B27K 3/00* | (2006.01) |
| *B27K 3/15* | (2006.01) |
| *B27K 3/02* | (2006.01) |
| *C08H 8/00* | (2010.01) |
| *C08K 3/08* | (2006.01) |
| *C08K 5/17* | (2006.01) |
| *C08L 1/28* | (2006.01) |
| *D21H 17/26* | (2006.01) |
| *D06M 15/09* | (2006.01) |

(52) U.S. Cl.
CPC ............ *B27K 3/153* (2013.01); *B27K 3/0292* (2013.01); *C08H 8/00* (2013.01); *C08K 3/08* (2013.01); *C08K 5/17* (2013.01); *C08L 1/284* (2013.01); *D21H 17/26* (2013.01); *B27K 2240/70* (2013.01); *C08L 1/28* (2013.01); *C08L 1/286* (2013.01); *D06M 15/09* (2013.01)

(58) Field of Classification Search
CPC ......................................................... B27K 3/00
USPC ..................... 427/408, 412.1, 415
See application file for complete search history.

(56) References Cited

U.S. PATENT DOCUMENTS

| | | | | |
|---|---|---|---|---|
| 2,983,629 | A * | 5/1961 | Anderson | B27K 3/15 427/297 |
| 3,493,417 | A * | 2/1970 | Moren | B05D 7/08 427/370 |
| 3,930,073 | A * | 12/1975 | Drelich | C08J 3/03 427/302 |
| 4,269,626 | A * | 5/1981 | Gorke | A01N 25/02 106/18.32 |
| 4,622,248 | A * | 11/1986 | Leach | A01N 59/16 106/18.32 |
| 4,970,201 | A * | 11/1990 | Giebeler | B27K 3/15 514/64 |
| 5,368,944 | A * | 11/1994 | Hartung | B05D 7/532 427/407.1 |
| 5,795,522 | A * | 8/1998 | Firgo | C08J 5/18 106/200.1 |
| 8,221,797 | B2 * | 7/2012 | Zhang | B27K 3/52 106/15.05 |
| 2002/0152560 | A1 * | 10/2002 | Soane | C08B 3/10 8/494 |
| 2003/0104135 | A1 * | 6/2003 | Grantham | B05D 7/06 427/397.8 |
| 2005/0192434 | A1 * | 9/2005 | Buchanan | A61K 9/2054 536/32 |
| 2007/0042124 | A1 * | 2/2007 | Matsumura | C08J 3/03 427/440 |
| 2009/0239749 | A1 * | 9/2009 | Duncalf | A01N 25/04 504/116.1 |
| 2013/0101741 | A1 * | 4/2013 | Wakamatsu | B27K 3/15 427/297 |

(Continued)

FOREIGN PATENT DOCUMENTS

| | | | |
|---|---|---|---|
| DE | 10160370 | 6/2003 | |
| DE | 10160370 A1 * | 6/2003 | .......... C04B 41/009 |
| EP | 67945 | 12/1982 | |
| KR | 2013016862 | 2/2013 | |
| WO | 2000009564 | 2/2000 | |

OTHER PUBLICATIONS

DE-10160370-A1 translation (Year: 2003).*

*Primary Examiner* — Cachet I Sellman

(57) ABSTRACT

A treated cellulosic material comprising a cellulosic material having a porous structure defining a plurality of pores, at least a portion of the pores containing a treating agent comprising a polymer comprising a modified cellulose polymer; and a modifying agent comprising a hydrophobic amine, a metal ion, or a quat. The present disclosure further describes a method for preparing a treated cellulosic material comprising (a) providing a cellulosic material; (b) a first treatment protocol comprising impregnating the cellulosic material with a dispersion comprising a polymer, the polymer comprising a modified cellulose polymer; and (c) a second treatment protocol comprising impregnating the cellulosic material with a modifying agent, the modifying agent comprising a hydrophobic amine, a metal ion, or a quat.

3 Claims, No Drawings

(56) References Cited

U.S. PATENT DOCUMENTS

2015/0158995 A1\* 6/2015 Tchang Cervin ....... C08B 15/06
106/122

\* cited by examiner

TREATED POROUS MATERIAL

BACKGROUND OF THE INVENTION

Porous materials, such as cellulosic materials, need to be protected from mold growth, insect attack, rot and water impregnation to help preserve the physical properties of the cellulosic material. One example of such a cellulosic material is wood. A variety of treatment agents and preservation methods are known to preserve cellulosic materials.

Modern preservation methods typically involve pressure treating the cellulosic material with a treating agent. Pressure treatment typically allows the treating agent to penetrate throughout the porous structure of the cellulosic material. The treating agent is typically a chemical compound selected to impart the desired physical properties to the cellulosic material. For example, treating agents that add water resistance and improve the dimensional stability of the cellulosic material are of interest. Wood is capable of absorbing as much as 100% of its weight in water which causes the wood to swell, which after loss of water through evaporation causes the wood to shrink. This process of water absorption/evaporation is non-uniform and creates internal stresses in the wood leading to splitting, warping, bowing, crooking, twisting, cupping, etc. Also, water can serve as a pathway for organisms that degrade the cellulosic material, such as insects or fungus.

Termites are one of the most significant insect groups responsible for wood damage. In order to mitigate termite damage, the use of naturally durable wood species, preservative treatments, and engineered wood products have been employed. However, the need for improved technologies for termite resistance are desirable due to the limited availability of durable woods, the high percentage weight gains required for preservatives to provide efficacy, and the "unnatural" look of engineered wood. A technology which is provides termite resistance and dimensional stability to wood is highly desirable.

Treating agents that repel insects, or minimize the formation of fungi/molds, or improve the overall durability of the cellulosic material are of interest. Further, treating agents can improve wind resistance, ultraviolet radiation resistance, stability at high and low temperatures, pest resistance, mold resistance, fire resistance and other issues which might affect the physical properties of the cellulosic material.

An improved treating agent for cellulosic materials is desired.

SUMMARY OF THE INVENTION

The present disclosure describes a treated cellulosic material comprising a cellulosic material having a porous structure defining a plurality of pores, at least a portion of the pores containing a treating agent comprising a polymer comprising a modified cellulose polymer; and a modifying agent comprising a hydrophobic amine, a metal ion, or a quat.

The present disclosure further describes a method for preparing a treated cellulosic material comprising (a) providing a cellulosic material; (b) a first treatment protocol comprising impregnating the cellulosic material with a dispersion comprising a polymer, the polymer comprising a modified cellulose polymer; and (c) a second treatment protocol comprising impregnating the cellulosic material with a modifying agent, the modifying agent comprising a hydrophobic amine, a metal ion, or a quat.

DETAILED DESCRIPTION OF THE INVENTION

As used herein, the term "porous material" refers to a material which is permeable such that fluids are movable therethrough by way of pores or other passages. Examples of porous materials include cellulosic material, stone, concrete, ceramics, and derivatives thereof. As used herein, the term "cellulosic material" refers to a material that includes cellulose as a structural component. Examples of cellulosic materials include wood, paper, textiles, rope, particleboard and other biologic and synthetic materials. As used herein, the term "wood" includes solid wood and all wood composite materials, e.g., chipboard, engineered wood products, etc. Cellulosic materials generally have a porous structure that defines a plurality of pores.

A "treated cellulosic material" is a cellulosic material that has been treated with a treating agent to modify the properties of the cellulosic material. The properties modified by the treating agent may include, but are not limited to, increased hydrophobicity, dimensional stability, fungi resistance, mold resistance, insect resistance, hardness, surface appearance, UV stability, fire resistance, and coatability. Increasing the hydrophobicity of a cellulosic material can provide other ancillary benefits by reducing the rate of water adsorption and evaporation, thus reducing the internal stresses of expanding and contracting.

A "treating agent" is a substance that, when combined with the cellulosic material, modifies the properties of the cellulosic material. In one instance, the treating agent comprises both a polymer and a modifying agent. In one instance, the treating agent comprises both a polymer and an emulsifying agent. In one instance, the treating agent comprises a polymer, an emulsifying agent and a modifying agent.

The treating agent is applied to the cellulosic material. One method of applying the treating agent to the cellulosic material is through impregnation using pressure treatment. In one instance, the polymer is applied to the cellulosic material as part of a dispersion. Other methods of applying the treating agent are known, such as brushing, coating, spraying, dipping, soaking and extrusion. Once applied, the treating agent will permeate at least a portion of the pores of the cellulosic material.

As used herein, the term "polymer" refers to a molecule that is formed from one or more types of monomers. The polymer may be a copolymer or a mixture of copolymers and polymers. As used herein the polymer is a modified cellulose polymer or a graft copolymer of cellulose. Graft copolymerization is a commonly used method for the modification of polymers and is used to modify the physical or chemical properties of polymers. Grafting forms side chains which are covalently bonded to the main polymer backbone or substrate to form a copolymer with a branched structure.

In one instance, the polymer comprises a modified cellulose polymer. In one instance, the modified cellulose polymer comprises methyl cellulose, ethyl cellulose, ethylhydroxyethyl cellulose, hydroxypropyl cellulose, hydroxypropylmethyl cellulose (also called hypromellose), methyl ethyl cellulose, carboxymethyl cellulose(CMC), sodium carboxymethyl cellulose, or cross-linked sodium carboxymethyl cellulose (also called croscarmellose sodium), cellulose gum, or cellulose gel, and their derivatives. Other suitable polymers and/or copolymers present in the mixture include elastomers, plastics and fibers. Commercial modified cellulose polymers are suitable, such as ETHOCEL™ available from The Dow Chemical Company. In another instance, the polymer comprises a cellulose graft polymer. In order to improve the hydrophobicity of the cellulose, hydrophobic monomers such as butyl acrylate, butyl methacrylate, styrene, butadiene, isobutyl vinyl ether, or vinyl acetate can be grafted onto the surface of the cellulose.

In one instance, the polymer is a constituent part of a dispersion. In one instance, the dispersion is a medium that comprises the polymer, water and one or more organic solvents. In one instance, the dispersion is a medium that comprises the polymer, an emulsifying agent, and water. In one instance, the dispersion is a medium that comprises the polymer, an emulsifying agent, water and one or more organic solvents. The dispersion is prepared such that the suspended particle size in the dispersion is suitable for penetrating the pores of the cellulosic material for distribution through the cellulosic material. In one instance, the dispersion also comprises one or more additives. In one instance, any solids present in the dispersion are held in a stable suspension and are transportable by the dispersion into the pores of the cellulosic material. A stable dispersion is a dispersion that, once formed, resists change in its properties over time and is therefore suitable for penetrating the pores of the cellulosic material. In one instance, the solid content of the dispersion is 1 to 80 weight percent. In one instance the organic solvent is an oxygenated solvent, a hydrocarbon solvent, a halogenated solvent, or a combination thereof. In one instance, the dispersion has a viscosity of 10-800 cP at room temperature. Preferably, the dispersion has a suitable viscosity to allow the dispersion to readily penetrate throughout the cellulosic material through pressure treatment. In one instance, the dispersion may be diluted, such as by water, to achieve a preferred viscosity.

As used herein, an "emulsifying agent" is a water soluble polymeric material that stabilizes an emulsion. Emulsifying agents suitable for use include conventional anionic, cationic, non-ionic emulsifiers, and any practical combinations thereof. The emulsifying agent is employed in forming a polymer-continuous heterogeneous composition in the dispersion. Specifically, the emulsifying agent (a) helps match the viscosity of the aqueous and polymer phases, thereby facilitating energy-efficient mixing of such phases; (b) reduces the interfacial tension thereby also reducing the mixing energy required in the initial process step and (c) helps stabilize the final aqueous dispersion. Selection of a suitable emulsifying agent for performing such functions for a particular polymer is made pursuant to conventional considerations such as compatibility, interfacial tension, ability to impart stability to the finished dispersion, etc.

Examples of water soluble polymeric emulsifying agents include polyvinyl alcohol (preferably having a molecular weight of at least about 50,000, especially of at least about 100,000); partially hydrolyzed (e.g., from about 85 to about 99 percent hydrolyzed) polyvinyl acetate (preferably having a molecular weight of at least about 50,000, especially of at least about 100,000); block copolymers of ethylene oxide and propylene oxide (such as those of the "Pluronic" trade name series and marketed by BASF Wyandotte, Industrial Chemical Division); natural products such as gum arabic, gum tragacanth, starches, etc.; the polymer of methyl vinyl ether; polyvinyl pyrrolidone; vinyl type copolymers of monomeric acids such as acrylic acid, methacrylic acid, maleic anhydride, crotonic acid with copolymerizable monomers such as vinyl acetate, styrene, ethylene, propylene, etc.; and the like.

In one instance, the emulsifying agent is included as part of the dispersion. The emulsifying agent is a substance that, when combined with the polymer interacts with at least a portion of the polymer. In one instance the emulsifying agent is a fatty acid neutralized by alkali metals, ammonia or organic derivatives thereof (including amines), for example oleic acid, sebacic acid, or the salts thereof.

In one instance, the treating agent includes a modifying agent. The "modifying agent" is a substance that, when combined with the polymer, modifies at least a portion of the polymer and/or modifies at least a portion of the materials in the dispersion. For example, the polymer may be modified, or one of the components of the dispersion (such as the oleic acid, if present), may be modified.

In one instance, the modifying agent is a hydrophobic amine, for example, a primary, a secondary or a tertiary amine. In one instance, the modifying agent is a hydrophobic amine salt. In one instance the hydrophobic amine contains only one amino group. The hydrophobic amine may be any suitable amine, such as a linear amine, a branched aliphatic amine, a cyclic amine, an aromatic amine, or a mixture thereof. The amine is selected such that the viscosity is low enough to penetrate the pores of the cellulosic material and contains six or more carbon atoms to provide sufficient hydrophobicity. In the case of highly viscous amines or solid amines, a solvent may be used, for example, water, oxygenated solvents, halogenated solvents, aromatic solvents, or hydrocarbons. Examples of hydrophobic amines include N-methyl N-hexyl amine, N,N-diethyl n-hexylamine, n-octyl amine, n-decyl amine n-dodecyl amine, N-methyl cyclohexylamine, N,N,-diethyl cyclohexylamine, dicyclohexylamine, benzyl amine, coco amine, oleyl amine, stearyl amine, and the N, N-dimethyl substituted fatty amines. In one example, the modifying agent is phenethylamine or tallow amine.

In one instance, the modifying agent comprises a bivalent, trivalent, or tetravalent metal ion, or a mixture thereof. Examples of suitable bivalent metal ions include $Ca^{2+}$, $Zn^{2+}$, $Mg^{2+}$, $Ba^{2+}$, $Fe^{2+}$, $Cu^{2+}$, $Sn^{2+}$, $S^{2+}$, and $Ni^{2+}$, or a mixture thereof. Example of suitable trivalent metal ions include $Fe^{3+}$, $B^{3+}$, $P^{3+}$, $Al^{3+}$, $Cu^{3+}$, $La^{3+}$, $Y^{3+}$, and $Ga^{3+}$, or a mixture thereof. Examples of suitable tetravalent metal ions include $Si^{4+}$, $S^{4+}$, $Ti^{4+}$, $Zr^{4+}$, $Sn^{4+}$, $Ce^{4+}$, and $Hf^{4+}$, or a mixture thereof.

In one instance, the modifying agent is a quaternary ammonium compound comprising a quaternary ammonium cation and an anion, and is referred to herein as a quat. Examples of suitable quaternary ammonium compounds include but are not limited to, those having the formula $R^1R^2R^3R^4N^+X$ where $R^1$, $R^2$, $R^3$, and $R^4$ independently are carbon substituents which are linear, branched, cyclic or any combination thereof saturated or unsaturated and X is an anion. The sum of the number of carbon atoms in $R^1$, $R^2$, $R^3$, and $R^4$ broadly ranges from about 8 to 50. $R^1$, $R^2$, $R^3$, and $R^4$ may be alkyl, alkenyl, alkynyl, cycloalkyl, aryl, or any combination of these, and the anion X may be chloride, bromide, iodide, borate, carbonate, bicarbonate, nitrite, or a carboxylate such as acetate, laurate or stearate. Examples of suitable modifying agents include trimethyl soya alkyl ammonium chloride, or an alkyl trimethyl ammonium chloride/bromide (where alkyl can be C12, C16, C18, C12, Coco, palmacyl), or a dialkyl dimethyl ammonium chloride/bromide (where alkyl can be —C8, C10, C12, C16, C18, Hydrogenated Tallow), or an alkyl dimethyl benzyl ammonium chloride/bromide (where alkyl can be C12, C14, C16, C18, Coco), or a mixture thereof.

The treating agent is combined with the cellulosic material. In one instance, the treating agent is introduced to the cellulosic material by pressure treatment, as described herein. In another instance, the treating agent is introduced to the cellulosic material by other techniques known in the art, for example, brushing, coating, dipping, soaking, spraying, and extrusion. The treating agent becomes impregnated in at least a portion of the pores of the cellulosic material, and thereby increases the weight of the cellulosic material. In one instance, the polymer increases the weight of the cellulosic material by 1 to 80 percent (as compared to the original weight of the cellulosic material and as calculated after drying the cellulosic material for at least 2 hours at or above 60° C.). In one instance, the treating agent increases the weight of the cellulosic material by 5 to greater than 100 percent (as compared to the original weight of the cellulosic material and as calculated after drying the cellulosic material for at least 2 hours at or above 60° C.).

In one instance, the treating agent comprises one or more additives. The additive may be included as part of the dispersion, as part of the modifying agent, or may be included separately therefrom. Additives which are known to add properties to treated cellulosic materials are suitable, such as, flame retardants, dispersants and/or dyes. For example, the additives may be organic compounds, metallic compounds, or organometallic compounds. In one instance, the additive is an ester, for example, dibutyl sebacate, which is a plasticizer used to help generate the dispersion. In one instance, the additive is a material which improves the wetting or penetration of the polymer into the wood, for example, solvents or surfactants (anionic, cationic or nonionic) that are stable in the dispersion. Examples of additives include solvents, fillers, thickeners, emulsifiers, dispersing agents, buffers, pigments, penetrants, antistatic agents, odor inhibitors, corrosion inhibitors, preservatives, siliconizing agents, rheology modifiers, anti-settling agents, anti-oxidants, other crosslinkers (e.g. diols and polyols), optical brighteners, waxes, coalescence agents, biocides and antifoaming agents. Such waxes may include petroleum waxes, paraffin waxes, a natural wax, or a synthetic wax such as polyethylene wax or oxidized polyethylene wax, beeswax, or slack wax. In one instance, the treating agent may be used in conjunction with wood preservatives containing, for example, cupric-ammonia, cupric-amine, cupric-ammonia-amine complexes, quaternary ammonium compounds, or other systems. For example, the treating agent may be used with Alkaline Copper-Quaternary ammonium (ACQ) preservative systems. The treating agent may also be used with wood preservative technologies which use zinc salts or boron containing compounds. Optionally, other additives such as insecticides, termiticides, fungicides, and moldicides may be added to the treating agent. In one instance, the additive is included as part of the dispersion and forms a stable suspension therewith. In one instance, one or more surfactant is added to the dispersion. In one instance, a surfactant is selected which reduces gelling of the polymer at the surface of the cellulosic material. In one instance, a surfactant is selected which increases the amount of polymer impregnated in the cellulosic material. For example, suitable surfactants may be nonionic, anionic, or cationic. Examples of nonionic surfactants include: alkoxylated alcohols, alkoxylated alkyl phenols, fatty acid esters, amine and amide derivatives, alkylpolyglucosides, ethylene oxide/propylene oxide copolymers, polyols and alkoxylated polyols. For example, a nonionic surfactant is TERGITOL™ L-62, commercially available from The Dow Chemical Company. Examples of anionic surfactants include: alkyl sulfates, alkyether sulfates, sulfated alkanolamides, alpha olefin sulfonates, lignosulfonates, sulfosuccinates, fatty acid salts, and phosphate esters. Examples of cationic surfactants include alkyltrimethylammonium salts.

In one instance, the cellulosic material is prepared as a treated cellulosic material by pressure treatment. The pressure used to pressure treat the cellulosic material may be either higher or lower than atmospheric pressure. In one instance, the pressure is lower than ambient pressure, for example, 0.0001 to 0.09 MPa (0.75 to 675 mmHg). In another instance, the pressure is greater than ambient pressure, for example, 0.1 to 1.7 MPa (750 to 12750 mmHg). It is envisioned that pressure treatment processes known in the art are suitable for impregnating the cellulosic material.

In one instance, the treated cellulosic material is prepared according to at least a first treatment protocol and a second treatment protocol. In one instance, the first treatment protocol comprises impregnating the cellulosic material with the polymer. The first treatment protocol comprises one or more of the following steps: (a) depositing the cellulosic material in a vessel; (b) holding the vessel at vacuum for 5 to 60 minutes; (c) introducing the polymer to the vessel; (d) pressurizing the vessel to 1.03 MPa for 5 to 60 minutes; (e) draining the excess polymer; (f) optionally removing excess polymer by vacuum and (g) drying the cellulosic material at 20 to 60° C. for 24 to 48 hours. In one instance, the polymer is part of the dispersion.

In one instance, the product of the first treatment protocol is subsequently prepared according to a second treatment protocol that impregnates the cellulosic material with the modifying agent. In one instance, the second treatment protocol comprises one or more of the following steps: (a) depositing the cellulosic material prepared according to the first treatment protocol in a vessel; (b) introducing the modifying agent to the vessel; (c) holding the vessel at either vacuum or increased pressure for 5 to 60 minutes; (d) optionally removing excess modifying agent by vacuum; and (e) drying the cellulosic material at 60° C. for 24 to 48 hours.

The several drying steps may be performed at a range of temperatures, whereby the duration of the drying step is proportional to the temperature. Suitable air-drying temperatures are between room temperature (roughly 20° C.) and 180° C. The drying may be performed in air, in nitrogen, or other suitable atmosphere.

A water immersion test is used to determine the water repellency of the treated cellulosic material according to the American Wood Protection Association Standard E4-11 procedure (Standard Method of Testing Water Repellency of Pressure Treated Wood). The water immersion test involves first, providing both a treated wafer, comprising a treated cellulosic material prepared as described herein, and a control wafer, comprising an untreated cellulosic material; second, measuring the tangential dimension of both the treated wafer and the control wafer to provide an initial tangential dimension ($T_1$) (where the tangential dimension is perpendicular to the direction of the grain of the cellulosic material); third, placing both the treated wafer and the control wafer in a conditioning chamber maintained at 65±3% relative humidity and 21±3° C. until a constant weight is achieved; fourth, immersing both the treated wafer and the control wafer in distilled water at 24±3° C. for 30 minutes; and fourth, measuring the tangential dimension of both the treated wafer and the control wafer following removal from the water to provide a post tangential dimension ($T_2$).

The percent swelling (S) for each individual wafer (both the treated wafer and the control wafer) is calculated as:

$$S(\%) = \frac{T_2 - T_1}{T_1} \times 100$$

In each of the Examples herein, the percent swelling of the control wafer is 4.7%.

Water-repellency efficiency (WRE) is used to determine the effectiveness of the treating agent in adding water repellant properties to the treated cellulosic material. WRE is calculated as:

$$WRE(\%) = \frac{S_1 - S_2}{S_1} \times 100$$

$S_1$ refers to the percent swelling of the untreated wafer; $S_2$ refers to the percent swelling of the treated wafer. According to E4-11, for most outdoor applications a minimum WRE of 75% is preferred. The WRE of the control wafer is 0%.

The hardness of the treated cellulosic material is determined according to the Shore (Durometer) test using a Type D Durometer (30° cone, 1.40 mm diameter, 2.54 mm extension, 44.48 N spring force). Hardness is determined using the Type D Durometer by placing the cellulosic material on a hard flat surface, and the foot of the durometer is pressed with the given spring force against the cellulosic material. The hardness value is recorded from the gauge on the Durometer within one second of contact with the cellulosic material. At least five hardness tests were performed per sample of cellulosic material. Hardness values reported herein are averages of the tests performed for a given cellulosic material. The hardness value of an untreated southern yellow pine control wafer is approximately 40.

The following Examples and Comparative Examples use two ethyl cellulose dispersions A and B. The following Examples illustrate certain aspects of the present disclosure, but the scope of the present disclosure is not limited to the following Examples.

Aqueous ethyl cellulose dispersions A and B, using the components and conditions as described in Tables I and II, are prepared using the following general procedure. Similar dispersions are sold under the trade name SURELEASE™ by Colorcon.

Components 1-3 listed in Table I are fed into a 25 mm diameter twin screw extruder using a controlled rate feeder or a positive displacement liquid pump as appropriate at the feed rates in grams/minute (g/min) indicated in Table I. Components 1-3 are forwarded through the extruder and melted to form a liquid melt material. The extruder temperature profile is ramped up to the temperature listed in the "Polymer Melt Zone" column of Table II. Water and neutralizing agent are mixed together and fed to the extruder at a rate indicated in Tables I (Base/Surfactant) for neutralization at an initial water introduction site. Dilution water is fed into the extruder via a positive displacement pump at the rate indicated in Table II. The extruder speed is 470 rpm in both cases as recorded in Table II. At the extruder outlet, a backpressure regulator is used to adjust the pressure inside the extruder barrel to a pressure adapted to reduce steam formation (generally, the pressure is in the range of about 2 MPa to about 4 MPa).

A dispersion product is removed from the extruder. The dispersion is filtered through a 200 micrometer (μm) filter. The resultant filtered dispersion has a solids content measured in weight percent (wt %); and the solids particles of the dispersion has a volume mean particle size (Vmean P.S.) measured in microns and recorded in Table II. The solids content of the dispersion is measured using an infrared solids analyzer; and the particle size of the solids particles of the dispersion is measured using a COULTER® LS-230 particle size analyzer (available from Beckman Coulter Corporation). The solids content and the mean particle size (PS) of the solids particles of the dispersion are described in Table II.

TABLE I

Composition and Process Conditions for Dispersions A and B

| Example | Component 1 (feed rate in g/min) | Component 2 (feed rate in g/min) | Component 3 (feed rate in g/min) | Initial Water (feed rate in g/min) | Base/Surfactant (feed rate in g/min) |
|---------|----------------------------------|----------------------------------|----------------------------------|------------------------------------|--------------------------------------|
| A | ETHOCEL STD 20 (50.5) | n/a | Oleic acid (6.1) | (12.7) | 28% ammonia (2.1) |
| B | ETHOCEL STD. 20 (42.0) | Dibutyl sebecate (9.6) | Oleic acid (5.1) | (14.6) | 28% ammonia (2.2) |

TABLE II

Composition and Process Conditions for Dispersions A and B

| Example | Dilution Water (feed rate in g/min) | Extruder Temperature in Polymer Melt Zone (° C.) | Extruder Speed (rpm) | % Solids | Vmean P.S. (microns) | pH | Viscosity, cP (Rv2, 50 rpm) |
|---------|--------------------------------------|-------------------------------------------------|----------------------|----------|----------------------|------|-----------------------------|
| A | 140 | 145 | 470 | 27.8% | 0.23 | 8.73 | 73 |
| B | 140 | 145 | 470 | 28.6% | 0.19 | 8.57 | 122 |

EXAMPLE 1

A pine wafer (southern yellow pine, 4 cm×2 cm×0.5 cm) is held at the bottom of a Parr reactor by a weight (here a ring is used). The reactor pressure is set to vacuum for 30 minutes. 80 ml of a dispersion comprising 20 percent solid concentration by weight of ethyl cellulose dispersion A (prepared as described above) and 80 percent by weight water is introduced to the reactor. The reactor pressure is then set to 1.03 MPa for 60 minutes under nitrogen. The wafer is then placed in an oven and dried in air at 60° C. for 48 hours. The wafer is held at the bottom of the reactor by the weight. The reactor is filled with sufficient phenethylamine (PEA) to submerge the wafer. The reactor pressure is set to vacuum for 60 minutes. The wafer is then placed in an oven and dried in air at 60° C. for 48 hours, thereby providing a treated wafer. The treated wafer and a control wafer are each processed according to the E4-11 procedure. The percent swelling of the wafer is 0.019%; the WRE of the wafer is 99.6%. The hardness of the treated wafer is measured as 45 using a Type D Durometer.

EXAMPLE 2

A pine wafer (southern yellow pine, 4 cm×2 cm×0.5 cm) is held at the bottom of a Parr reactor by a weight (here a ring is used). The reactor pressure is set to vacuum for 30 minutes. 80 ml of a dispersion comprising 20 percent solid concentration by weight of ethyl cellulose dispersion B (prepared as described above) and 80 percent by weight water is introduced to the reactor. The reactor pressure is then set to 1.03 MPa for 60 minutes under nitrogen. The wafer is then placed in an oven and dried in air at 60° C. for 48 hours. The wafer is held at the bottom of the reactor by the weight. The reactor is filled with sufficient phenethylamine (PEA) to submerge the wafer. The reactor pressure is set to vacuum for 60 minutes. The wafer is then placed in an oven and dried in air at 60° C. for 48 hours, thereby providing a treated wafer. The treated wafer and a control wafer are each processed according to the E4-11 procedure. The percent swelling of the wafer is 0.67%; the WRE of the wafer is 85.9%. The hardness of the treated wafer is measured as 47 using a Type D Durometer.

COMPARATIVE EXAMPLE 1

A pine wafer (southern yellow pine, 4 cm×2 cm×0.5 cm) is held at the bottom of a Parr reactor by a weight (here a ring is used). The reactor pressure is set to vacuum for 30 minutes. 80 ml of a dispersion comprising 20 percent solid concentration by weight of ethyl cellulose dispersion A (prepared as described above) and 80 percent by weight water is introduced to the reactor. The reactor pressure is then set to 1.03 MPa for 60 minutes under nitrogen. The wafer is then placed in an oven and dried in air at 60° C. for 48 hours, thereby providing a treated wafer. The treated wafer and a control wafer are each processed according to the E4-11 procedure. The percent swelling of the wafer is 5.8%; the WRE of the treated wafer is −23%. The hardness of the treated wafer is measured as 50 using a Type D Durometer.

COMPARATIVE EXAMPLE 2

A pine wafer (southern yellow pine, 4 cm×2 cm×0.5 cm) is held at the bottom of a Parr reactor by a weight (here a ring is used). The reactor pressure is set to vacuum for 30 minutes. 80 ml of a dispersion comprising 20 percent solid concentration by weight of ethyl cellulose dispersion B (prepared as described above) and 80 percent by weight water is introduced to the reactor. The reactor pressure is then set to 1.03 MPa for 60 minutes under nitrogen. The wafer is then placed in an oven and dried in air at 60° C. for 48 hours, thereby providing a treated wafer. The treated wafer and a control wafer are each processed according to the E4-11 procedure. The percent swelling of the wafer is 6.5%; the WRE of the treated wafer is −38%. The hardness of the treated wafer is measured as 46 using a Type D Durometer.

The Examples illustrate that when the cellulosic material is treated with the treating agent, including both the polymer and the modifying agent, favorable WRE results are obtained. The Comparative Examples are performed without the use of a modifying agent, and have less favorable WRE results than the Examples, illustrating the importance of the modifying agent.

What is claimed is:

1. A method for preparing a treated cellulosic material comprising:
    (a) providing a cellulosic material;
    (b) a first treatment protocol comprising impregnating the cellulosic material with a dispersion comprising a polymer, the polymer comprising a modified cellulose polymer; and
    (c) a second treatment protocol comprising impregnating the cellulosic material with a modifying agent, the modifying agent comprising a hydrophobic amine, wherein the hydrophobic amine comprises N-methyl N-hexyl amine, N,N-diethyl n-hexylamine, n-octyl amine, n-decyl amine n-dodecyl amine, N-methyl cyclohexylamine, N,N,-diethyl cyclohexylamine, dicyclohexylamine, benzyl amine, coco amine, oleyl amine, stearyl amine, N, N-dimethyl substituted fatty amines, phenethylamine, tallow amine or a mixture thereof.

2. The method of claim 1, wherein the impregnating of the first treatment protocol is conducted under pressure greater than or lower than ambient.

3. The method of claim 1, wherein the modified cellulose polymer comprises methyl cellulose, ethyl cellulose, ethylhydroxyethyl cellulose, hydroxypropyl cellulose, hydroxypropylmethyl cellulose (also called hypromellose), methyl ethyl cellulose, carboxymethyl cellulose(CMC), sodium carboxymethyl cellulose, or cross-linked sodium carboxymethyl cellulose (also called croscarmellose sodium), cellulose gum, or cellulose gel, and their derivatives.

* * * * *